US011427041B2

(12) United States Patent
Young

(10) Patent No.: US 11,427,041 B2
(45) Date of Patent: Aug. 30, 2022

(54) CHAIN SYSTEM FOR A CONTINUOUS TRACK

(71) Applicant: Stanley Young, Mack, CO (US)

(72) Inventor: Stanley Young, Mack, CO (US)

( * ) Notice: Subject to any disclaimer, the term of this patent is extended or adjusted under 35 U.S.C. 154(b) by 477 days.

(21) Appl. No.: 16/743,967

(22) Filed: Jan. 15, 2020

(65) Prior Publication Data

US 2021/0214028 A1 Jul. 15, 2021

(51) Int. Cl.
*B60C 27/06* (2006.01)
*B60C 27/08* (2006.01)
*B62D 55/28* (2006.01)

(52) U.S. Cl.
CPC .............. *B60C 27/08* (2013.01); *B60C 27/06* (2013.01); *B62D 55/283* (2013.01)

(58) Field of Classification Search
CPC ..... B60C 27/00; B60C 27/0238; B60C 27/06; B60C 27/067; B60C 27/08; B62D 55/08; B62D 55/18; B62D 55/27; B62D 55/283
USPC ................ 152/208, 221, 222, 223, 231, 232
See application file for complete search history.

(56) References Cited

U.S. PATENT DOCUMENTS

| | | | | |
|---|---|---|---|---|
| 1,695,657 A | * | 12/1928 | Kegresse | B62D 55/27 305/157 |
| 4,416,319 A | * | 11/1983 | Hofmann | B60C 27/10 24/68 TT |
| 8,016,369 B2 | * | 9/2011 | Breton | B62D 55/28 305/180 |
| 2021/0147015 A1 | * | 5/2021 | Blanchard | B62D 55/283 |

FOREIGN PATENT DOCUMENTS

AT     522069 B1 * 8/2020

* cited by examiner

*Primary Examiner* — Jason S Daniels
(74) *Attorney, Agent, or Firm* — Heuton IP Law, LLC

(57) ABSTRACT

A chain system is provided that is attached to a continuous track of a tracked vehicle. Embodiments of the chain system can include cross chains that extend from a side chain, and a hook is disposed at a free end of each cross chain. To attach the chain system to the track, the hooks are attached to an inner edge of the track on a top surface of the track. Once all of the hooks are attached, the ends of the side chain are attached to each other and the chain is secured to the track to improve the traction of the track and the tracked vehicle.

20 Claims, 7 Drawing Sheets

CHAIN SYSTEM FOR A CONTINUOUS TRACK

FIELD

Embodiments of the present disclosure are related to chain systems for a tracked vehicle that improve the traction of the tracked vehicle in rough terrain and adverse weather conditions.

BACKGROUND

Vehicles are often expected, or even needed, to perform in adverse weather conditions, including snowy or icy conditions. However, wheels on a wheeled vehicle are typically optimized for use on paved roads in clear conditions or even rainy conditions. This optimization for paved roads improves the fuel economy of the wheeled vehicle and reduces wear on the roads. Yet during snowy or icy conditions, the wheels may not provide enough traction on the road to operate safely. The vehicle can slide on the snow or ice, and the operator of the vehicle can completely lose control of the vehicle. This impedes the ability of the vehicle to transport people or products during normal situations, or worse, during emergency situations.

There are some existing solutions to improve the traction of a wheeled vehicle during snowy or icy conditions. One solution is to replace conventional tires with winter tires that have studs or deeper recesses in the tread of the tire to focus the weight of the vehicle on a smaller area. As a result, the studs or tread dig into the snow or ice with more force for better traction. However, there is a substantial cost and effort associated with buying another set of tires, or even wheels, to replace conventional tires with winter tires.

Another solution is to temporarily attach snow chains to conventional tires to improve the traction of the tires. The snow chains are wrapped around the tires for use in snowy or icy conditions and then removed when improved traction is no longer needed. Snow chains are preferred over snow tires in some situations since snow chains do not require removing the tire or the wheel from the vehicle. Many snow chains have a ladder type of configuration with a rim chain, an outer chain, and cross chains extending between the rim and outer chains like the steps of a ladder. To attach a snow chain to a tire, the chain is partially wrapped around the tire. The car moves to rotate the wheel and tire, and then the chain is completely wrapped around the tire. The two ends of the rim chain are secured together and are positioned on the inner sidewall of the tire, and the two ends of the outer chain are secured together and are positioned on the outer sidewall of the tire. As a result, the cross chains extend laterally across the tread of the tire, and the weight and power of the vehicle is focused on the smaller area of the cross chains to improve the traction of the vehicle.

Tracked vehicles could also benefit from improved traction in snowy or icy conditions. Tracked vehicles run on a continuous band of tread or track links driven by two or more wheels. The large surface area of the outer tread of the track is positioned against the ground, which distributes the weight of the vehicle better than wheels or tires on an equivalent vehicle. This enables continuous tracked vehicles to, for example, traverse soft ground with less likelihood of becoming stuck due to sinking. However, the distribution of weight over a large surface area makes it difficult for tracks, especially tracks designed for use on paved roads, to provide sufficient traction in snowy or icy conditions.

Existing snow chains do not work with tracks for a number of reasons. When a ladder style chain is placed on the ground and the track moves onto the chain, any bunching of the chain in a longitudinal direction of the chain must be undone, otherwise the chain will not fit properly on the track. This is not a difficult issue for tires since only a small area of the tire contacts the chain laid on the ground. In addition, due to the nature of the track, there is limited space to secure the snow chain on the interior side of the track. In contrast, the circular nature of a tire allows a person to easily access the interior side of the tire.

SUMMARY

The above shortcomings with attaching snow chains onto tracks and other needs are addressed by the various embodiments and configurations of the present disclosure described herein. Various aspects of the chain system described herein allow for the quick selective engagement of a chain system to a track without bunching. Another objective of the chain system is to provide a chain system that accounts for the lack of access to the interior side of the track to secure the chain system to the track.

One aspect of embodiments of the present disclosure is to provide a chain system that has a hook on a free end of a cross chain. Instead of extending to an inner chain, the cross chains can extend to a free end that has a hook. To secure the chain system to the inner side of the track, the cross chains extend laterally across the track, and the hook of each cross chain attaches to an inner edge of the track. Thus, the person attaching to the chain system to the track does not need fully access to the inner side of the track or the space between the track and the vehicle. Instead, the person only needs to reach over the track and connect the hook to the inner edge of the track.

Another aspect of embodiments of the present disclosure is to provide a chain system that is positioned on a top side of the track and then rotated onto an underside of the track. The cross chains can be laid on a top surface of the track, and the hook of each cross chain is attached to the inner edge. As a result, the spacing between each cross chain along a longitudinal length of the track is established. To keep attaching the chain system to the track, the track rotates, for instance, to propel the vehicle forward. Some of the already-attached hooks and cross chains move to a bottom surface of the track between the track and the ground surface. The hooks prevent the chain system from bunching up. The process continues until each cross chain is attached to the inner edge of the track. It will be appreciated that embodiments of the present disclosure encompass other processes for securing the chain system to a track, including raising the track off of the ground and securing the chain system to the track without moving the vehicle or rotating the track.

A further aspect of embodiments of the present disclosure is to provide a chain system that has only a side chain or line. As noted above, the cross chains extend from a single side chain or side chain. Once the hook of each cross chain is connected, the ends of the side chain are connected together to secure the chain system to the track. Since there is only a single side chain at the outer edge of the track, the person attaching the chain system does not need to access the inner side of the track or the space between the track and the vehicle.

It will be appreciated that embodiments of the present disclosure can be used with not only tracks, but with wheels and other components that can benefit from the improved traction of the chain system. In addition, though embodiments of the present disclosure are described herein as a chain system or having chains, embodiments of the present disclosure encompass other lines. For instance, "chain" can include a cable, a rope, a wire, a cord, or any other similar structure. Embodiments of the present disclosure encompass other chain patterns such as an "H" pattern. Embodiments of the present disclosure encompass a variety of materials. The link in a chain are typically made from a metallic material, but embodiments of the present disclosure encompass carbon fiber, wire strands, organic fibers, or any other similar material.

One particular embodiment of the present disclosure is a chain system for a track, comprising a side chain extending along a longitudinal direction from a first end to a second end; a plurality of cross chains extending from the side chain in a lateral direction, wherein each cross chain of the plurality of cross chains has a free end; a hook positioned at the free end of each cross chain in the plurality of cross chains, each hook having a first portion connected to the free end, a second portion connected to the first portion, and a third portion connected to the second portion, wherein the first and second portions form an angle greater than 90 degrees, the second and third portions form an angle greater than 90 degrees, and a length of the third portion is greater than a length of the first portion, and wherein the first, second, and third portion define a space configured to receive an inner edge of a track.

In some embodiments, the chain system further comprises a fastener that selectively connects the first end of the side chain to the second end of the side chain to secure the chain system to the track. In various embodiments, cross chains of the plurality of cross chains extend from the side chain at points that are offset from each other by a predetermined distance. In some embodiments, the plurality of cross chains comprises twenty two cross chains. In various embodiments, the length of the third portion is between approximately 157% and 186% of a length of the second portion. In some embodiments, an angle formed by an axis of the second portion and an axis of the third portion is between approximately 100 and 130 degrees. In various embodiments, at least one link of each cross chain of the plurality of cross chains comprises at least a quarter twist along a length of the at least one link.

Another particular embodiment of the present disclosure is a chain system for a track, comprising a side chain extending along a longitudinal direction from a first end to a second end; a plurality of cross chains extending from the side chain in a lateral direction, wherein each cross chain of the plurality of cross chains has a free end; a hook positioned at the free end of each cross chain in the plurality of cross chains, each hook having a distal portion and an end portion connected to the distal portion, wherein a length of the distal portion is between approximately 157% and 186% of a length of the end portion, and wherein the distal portion and the end portion define a space configured to receive an inner edge of a track.

In various embodiments, the length of the end portion is between approximately 70% to 85% of a length of a proximal portion connected to the additional portion, and wherein the length of the distal portion is between approximately 125% and 145% of the length of the proximal portion. In some embodiments, an angle formed by an axis of the proximal portion and an axis of the end portion is between approximately 90 and 110 degrees. In various embodiments, an angle formed by an axis of the end portion and an axis of the distal portion is between approximately 100 and 130 degrees. In some embodiments, the chain system further comprises a fastener that selectively connects the first end of the side chain to the second end of the side chain to secure the chain system to the track. In various embodiments, the plurality of cross chains comprises twenty two cross chains. In some embodiments, cross chains of the plurality of cross chains extend from the side chain at points that are offset from each other by a predetermined distance. In some embodiments, the chain system further comprises a tension member extending between two links of the side chain, wherein the tension member biases the two links toward each other. In various embodiments, the tension member comprises a spring with a first end connected to a first link and a second end connected to a second link.

A further particular embodiment of the present disclosure is a chain system for a track, comprising a track having an outer surface with a tread, an inner edge, and an outer edge; a side chain extending along a longitudinal direction from a first end to a second end; a plurality of cross chains extending from the side chain in a lateral direction, wherein each cross chain of the plurality of cross chains has a free end; a hook positioned at the free end of each cross chain in the plurality of cross chains, each hook is secured to the inner edge; and a fastener that selectively connected the first end of the side chain to the second end of the side chain proximate to the outer edge such that cross chains of the plurality of cross chains extend laterally across the tread of the track.

In some embodiments, the tread comprises a plurality of recesses, and wherein the hook is secured in a recess of the plurality of recesses. In various embodiments, cross chains of the plurality of cross chains extend from the side chain at points that are offset from each other by a predetermined distance. In some embodiments, the hook comprises a distal portion and an end portion connected to the distal portion, and wherein a length of the distal portion is between approximately 157% and 186% of a length of the end portion. In various embodiments, an angle formed by an axis of the end portion and an axis of the distal portion is between approximately 100 and 130 degrees. In some embodiments, a size of the track is 320×86×52.

Another particular embodiment of the present disclosure is a method for securing a chain system to a track, comprising (i) providing a track having an outer surface with a tread, an inner edge, and an outer edge; (ii) positioning a side chain on a top side of the outer surface of the track proximate to the outer edge; (iii) laying a plurality of cross chains that extend from the side chain on the top side of the outer surface of the track; (iv) connecting a hook on a free end of each cross chain of the plurality of cross chains to the inner edge of the track; and (v) rotating the track such that at least one of the connected hooks and side chains moves from the top side of the outer surface of the track to a bottom side of the outer surface of the track.

In some embodiments, the method further comprises (vi) connecting, by a fastener, a first end of the side chain to a second end of the side chain to secure the side chain and the plurality of cross chains to the track. In various embodiments, each hook has a first portion connected to the free end, a second portion, and a third portion, wherein the first and second portions form an angle greater than 90 degrees, the second and third portions form an angle greater than 90 degrees, and the third portion is longer than the first portion. In some embodiments, the tread comprises a plurality of recesses, and wherein the hook is secured in a recess of the plurality of recesses. In various embodiments, the cross chains of the plurality of cross chains extend from the side chain at points that are offset from each other by a predetermined distance. In some embodiments, the plurality of cross chains comprises twenty two cross chains.

The Summary is neither intended nor should it be construed as being representative of the full extent and scope of the present disclosure. Embodiments are set forth in various levels of detail in the Summary as well as in the attached drawings and the Detailed Description and no limitation as to the scope of the present disclosure is intended by either the inclusion or non-inclusion of elements or components. Additional aspects of the chain system and methods of use will become more readily apparent from the Detailed Description, particularly when taken together with the drawings.

The above-described embodiments, objectives, and configurations are neither complete nor exhaustive. As will be appreciated, other embodiments are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary, brief description of the drawings, detailed description, abstract, and claims themselves.

BRIEF DESCRIPTION OF THE DRAWINGS

The accompanying drawings, which are incorporated in and constitute a part of the specification, illustrate embodiments of the chain system and together with the Summary given above and the Detailed Description of the drawings given below, serve to explain the principles of these embodiments. In certain instances, details that are not necessary for an understanding of the chain system or that render other details difficult to perceive may have been omitted. It should be understood, of course, that the chain system is not necessarily limited to the particular embodiments illustrated herein. Additionally, it should be understood that the drawings are not necessarily to scale.

Figure 1:
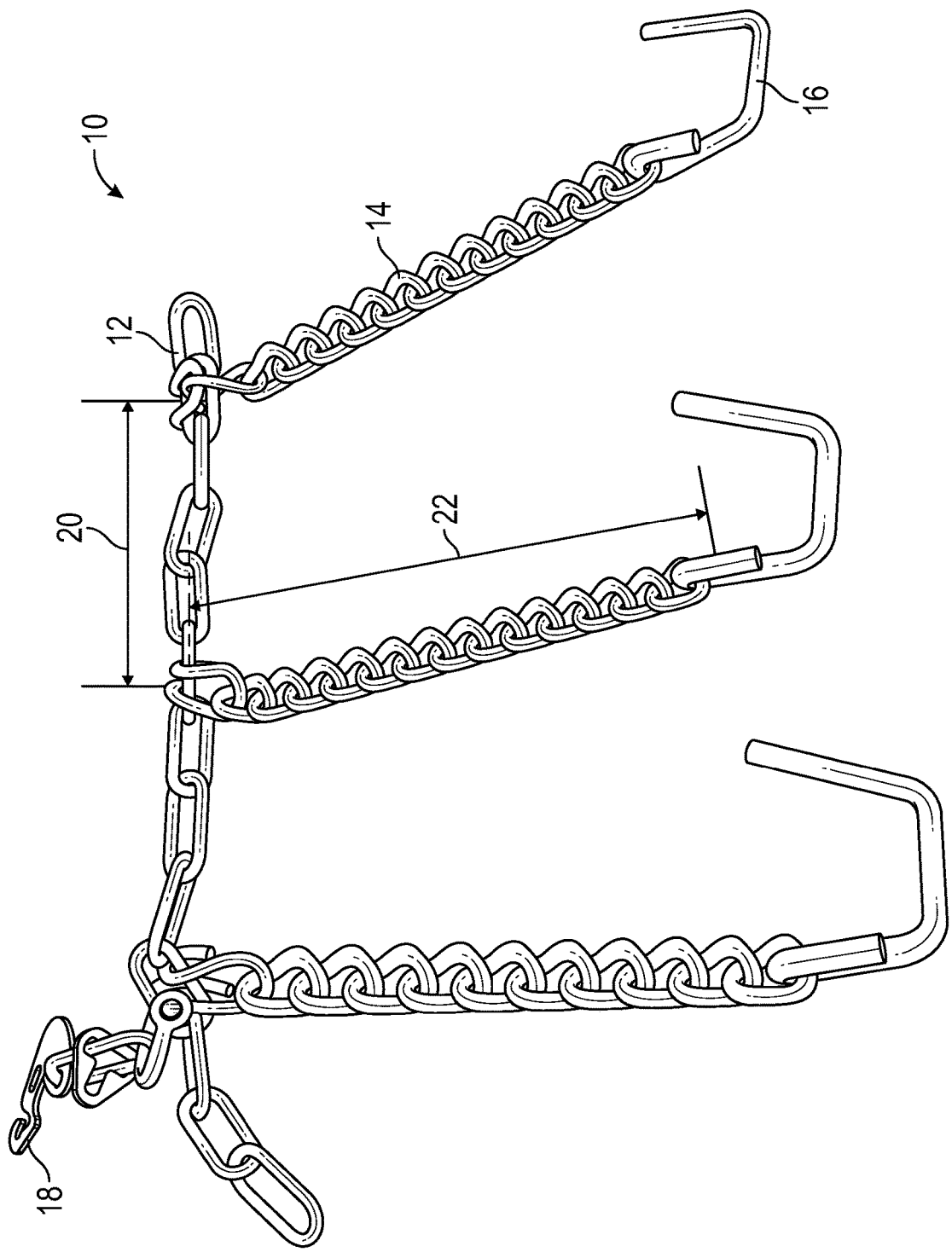
FIG. 1 is a perspective view of a chain system in accordance with one embodiment.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|---|---|
| 10 | Chain System |
| 12 | Side Chain |
| 14 | Cross Chain |
| 16 | Hook |
| 18 | Fastener |
| 20 | Cross Chain Pitch |
| 22 | Cross Chain Length |
| 24 | Side Link |
| 26 | Cross Link |
| 28 | Joint Link |
| 30 | Joint Link End |
| 32 | First Portion |
| 34 | Second Portion |
| 36 | Third Portion |
| 38 | First Axis |
| 40 | Second Axis |
| 42 | Third Axis |
| 44 | First Angle |
| 46 | Second Angle |
| 48 | Fastener Link |
| 50 | Retainer |
| 52 | Aperture |
| 54 | Fastener Plate |
| 56 | Plate Hook |
| 58 | Track |
| 60 | Tread |
| 62 | Recess |
| 64 | Protrusion |
| 66 | Side Edge |
| 68 | Inner Edge |
| 69 | Tension Member |
| 70 | Provide Track |
| 72 | Elevate Track |
| 74 | Place Hooks |
| 76 | Secure Chain |
| 78 | Provide Track |

| Number | Component |
|---|---|
| 80 | Place Hooks |
| 82 | Rotate Track |
| 84 | Place Hooks |
| 86 | Secure Chain |

DETAILED DESCRIPTION

The chain system has significant benefits across a broad spectrum of endeavors. It is the Applicant's intent that this specification and the claims appended hereto be accorded a breadth in keeping with the scope and spirit of the disclosure despite what might appear to be limiting language imposed by the requirements of referring to the specific examples disclosed. To acquaint persons skilled in the pertinent arts, a preferred embodiment that illustrates the best mode now contemplated for putting the chain system into practice is described herein by, and with reference to, the annexed drawings that form a part of the specification. The exemplary embodiment is described in detail without attempting to describe all of the various forms and modifications in which the chain system might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments are described herein and as depicted in the drawings. It is expressly understood that although the figures depict chain systems, sliding baskets, and methods and systems for using the same, the present disclosure is not limited to these embodiments.

Referring now to FIG. 1, a perspective view of a chain system 10 is provided. Generally, the chain system 10 has a side chain 12 that extends along a longitudinal length of the chain system 10 and a plurality of cross chains 14 that extend from the side chain 12 in a lateral direction. A hook 16 is connected to a distal or free end of each cross chain 14 to secure the chain system 10 to an inner edge of a track. Lastly, a fastener 18 is positioned at one end of the side chain 12, and the fastener 18 is configured to selectively connect to an opposing end of the side chain 12 to secure the chain system 10 to a track. As described in detail below, the arrangement of components allows the chain system 10 to be quickly and manually, but also securely, placed onto a track to improve the traction of the track.

The cross chains 14 have a cross chain pitch 20 or distance between adjacent cross chains 14 along the longitudinal length of the side chain 12. In some embodiments, the cross chain pitch 20 is between approximately 6 and 9 inches. The term "approximately" as used herein can imply a variation of +/−10% on a relative basis. In various embodiments, the cross chain pitch 20 is approximately 7.5 inches. The cross chains 14 also have a length 22, which in some embodiments is between approximately 15 and 18 inches. In various embodiments, the cross chain length 22 is 16.5 inches.

The chain system 10 shown in FIG. 1 is configured to fit on a track having a width of 320 mm or 12.6 inches and a length of 4472 mm or 176 inches. However, it will be appreciated that embodiments of the present disclosure can apply to other track sizes. Accordingly, the cross chain length 22 and the cross chain pitch 20 can be expressed in terms relative to the track width and the track length, respectively. Thus, the cross chain length 22 is between approximately 119% and 143% of the track width in some embodiments. In various embodiments, the cross chain length 22 is approximately 131% of the track width. The cross chain pitch 20 is between approximately 3.4% and 5.2% of the track length in some embodiments. In various embodiments, the cross chain pitch 20 is approximately 4.3% of the track length.

Figure 2:
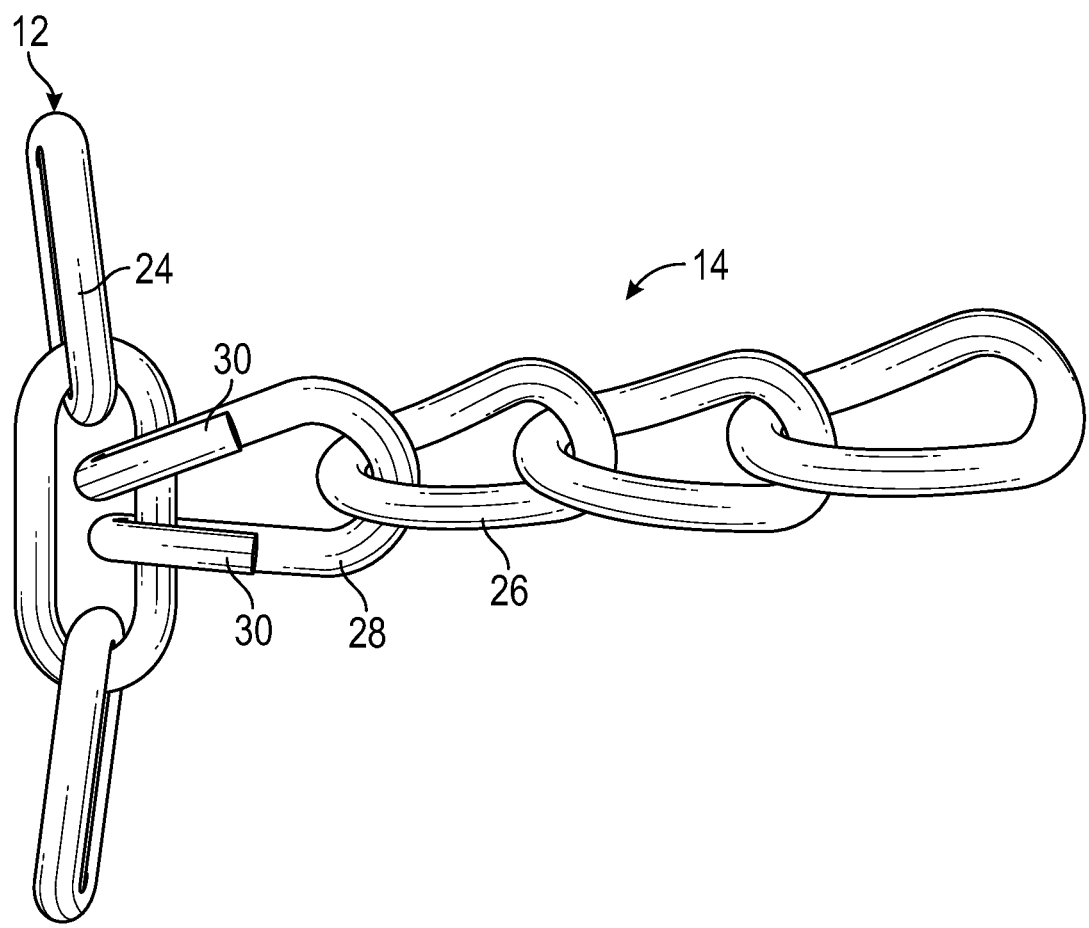
FIG. 2 is a top plan view of a side chain and a cross chain in accordance with one embodiment.

Referring now to FIG. 2, a top plan view of a side chain 12 and a cross chain 14 is provided. The side chain 12 has links 24 that are generally straight without any twisting whereas the cross chain 14 has links 26 that have a quarter twist along a longitudinal length of the link 26. The twist allows the cross chain 14 to better distribute forces among the various links 26 instead of focusing the weight of the tracked vehicle on only a few of the links 26. However, it will still be appreciated that the side chain 12 and the cross chains 14 can have any style of links, with or without twisting, in various embodiments of the present disclosure. Also shown in FIG. 2 is a joint link 28 that is part of the cross chain 14, and the joint link 28 joins the cross chain 14 to the side chain 12. Due to the construction of the joint link 28, the joint link 28 has two free ends 30 facing upward. In a preferred embodiment, when the chain system is positioned on a track, the free ends 30 face the track rather than away from the track to help secure the chain system to the track.

Figure 3A:
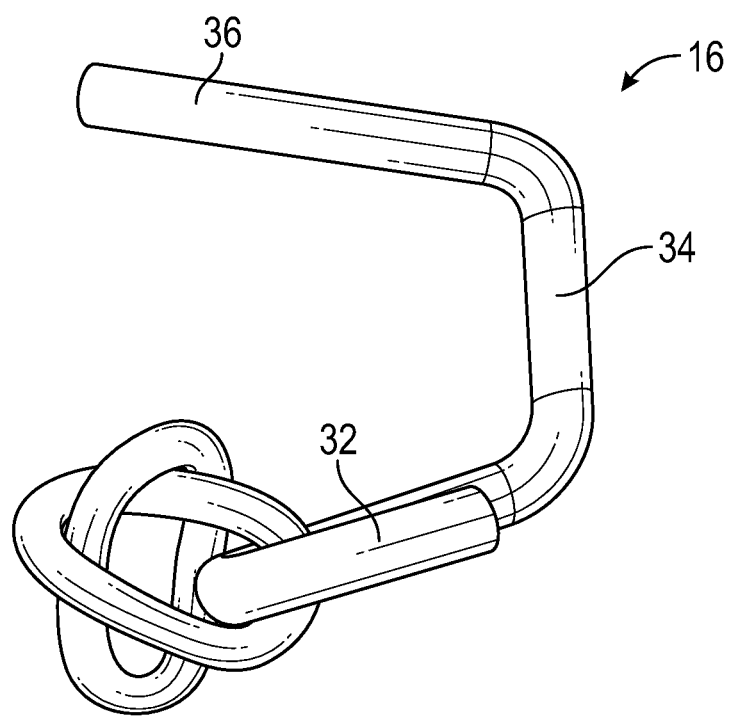
FIG. 3A is a side elevation view of a hook in accordance with one embodiment.
Figure 3B:
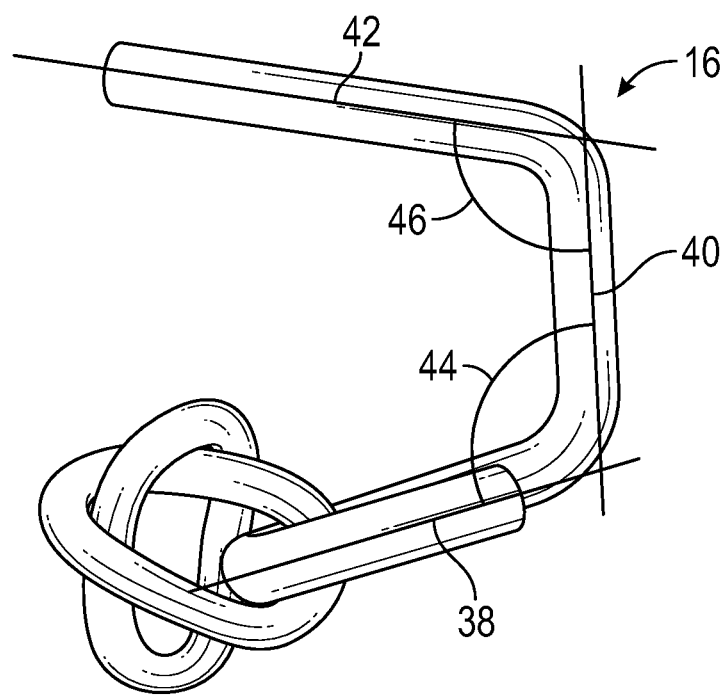
FIG. 3B is a side elevation view of a hook in accordance with one embodiment.

Now referring to FIGS. 3A and 3B, top plan views of a hook 16 are provided. The hook 16 is connected to a distal or free end of the cross chain, and the hook 16 engages an inner edge of a track to help secure the chain system to the track. The hook 16 has a particular configuration to be quickly and manually, but also securely, placed onto a track. Without this configuration, the hook 16 may not securely attach onto the inner edge of the track or may prematurely release from the inner edge during use of the track. In either case, the result can be performance issues, damage to property, or even injury to a person.

In the depicted embodiment, the hook 16 has a first portion 32 connected to the cross chain, a second portion 34 connected to the first portion 32, and a third portion 36 connected to the second portion 34. The third portion 36 can be referred to as a distal portion, the second portion 34 as an end portion, and the first portion 32 as a proximal portion. The first portion 32 has a curved end to extend through a link of the cross chain, and a length from the curved end to the opposing end of the first portion 32 is between approximately 2 and 2.5 inches in some embodiments. In various embodiments, the length of the first portion 32 is approximately 2.25 inches. The length of the second portion 34 is between approximately 1.5 and 2 inches in some embodiments. In various embodiments, the length of the second portion 34 is approximately 1.75 inches. The length of the third portion 36 is between approximately 2.75 and 3.25 inches in some embodiments. In various embodiments, the length of the third portion 36 is approximately 3 inches.

Again, as embodiments of the present disclosure encompass chain systems and tracks of different sizes, the dimensions of the hook 16 can be expressed in terms relative to a track width of 12.6 inches. Thus, the length of the first portion 38 is between approximately 15.8% and 19.9% of the track width in some embodiments. In various embodiments, the length of the first portion 38 is approximately 17.9% of the track width. The length of the second portion 34 is between approximately 11.8% of the track width in some embodiments. In various embodiments, the length of the second portion 34 is approximately 13.9% of the track width. The length of the third portion 36 is between approximately 21.8% and 25.8% of the track width in some embodiments. In various embodiments, the length of the third portion 36 is approximately 23.8% of the track width.

The lengths of these portions 32, 34, 36 can also be expressed relative to other components. For example, the length of the second portion 34 is between approximately 70% to 85% of the length of the first portion 32 in some embodiments. In various embodiments, the length of the second portion 34 is approximately 77.8% of the first portion 32. The length of the third portion 36 is between approximately 125% and 145% of the length of the first portion in some embodiments. In various embodiments, the length of the third portion 36 is approximately 133.3% of the length of the first portion 32. In addition, the length of the third portion 36 is between approximately 157% and 186% of the length of the second portion 34 in some embodiments. In various embodiments, the length of the third portion 36 is approximately 171% of the length of the second portion 34.

Similarly, the length of the first portion 32 is between approximately 12.1% and 15.2% of the length of the cross chain in some embodiments. In various embodiments, the first portion 32 is approximately 13.6% of the length of the cross chain. The length of the second portion 34 is between approximately 9.1% and 12.1% of the length of the cross chain in some embodiments. In various embodiments, the length of the second portion 34 is approximately 10.6% of the length of the cross chain. The length of the third portion 36 is between approximately 16.6% and 19.7% of the length of the cross chain in some embodiments. In various embodiments, the length of the third portion 36 is approximately 18.2% of the length of the cross chain.

FIG. 3B shows the angles between the portions 32, 34, 36 that also help quickly and manually, but also securely, place the hook 16 onto the track. The angle 44 between an axis 38 of the first portion and an axis 40 of the second portion is between approximately 90 and 110 degrees in some embodiments. In various embodiments, the angle 44 is approximately 96.4 degrees. The angle 46 between an axis 40 of the second portion and an axis 42 of the third portion is between approximately 100 and 130 degrees in some embodiments. In various embodiments, the angle 46 is approximately 112 degrees.

It will be appreciated that while three distinct portions 32, 34, 36 are described herein, embodiments of the present disclosure encompass a hook 16 that has fewer or greater than three portions. This includes a single continuous portion that employs the relationships between portions 32, 34, 36 described above to quickly and manually, but also securely, place the hook 16 onto a track.

Figure 4A:
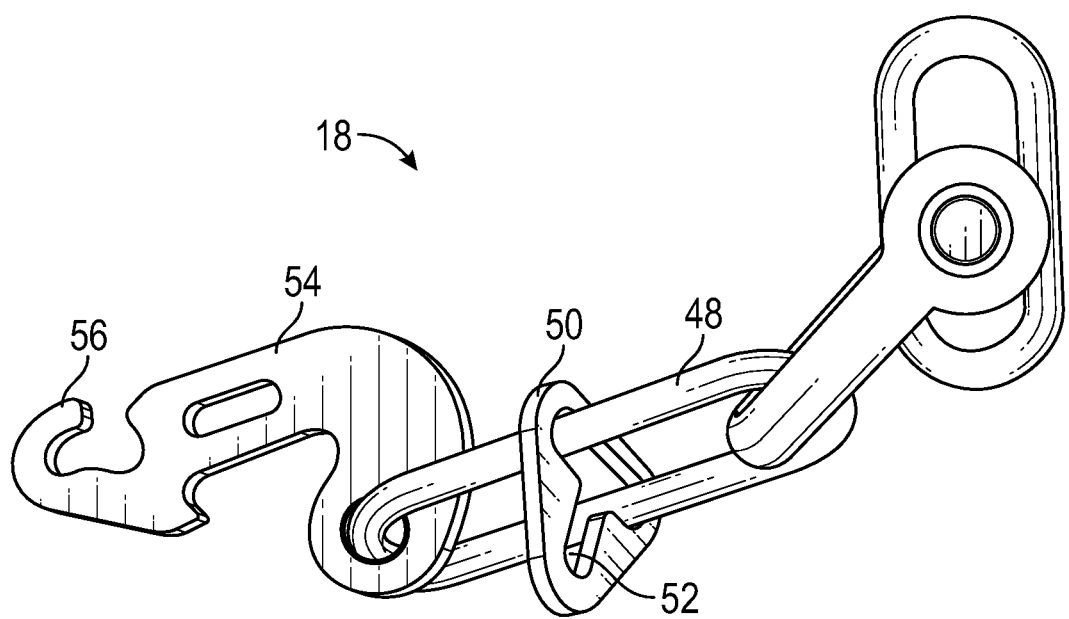
FIG. 4A is a perspective view of a chain system and a fastener in an unlocked state in accordance with one embodiment.
Figure 4B:
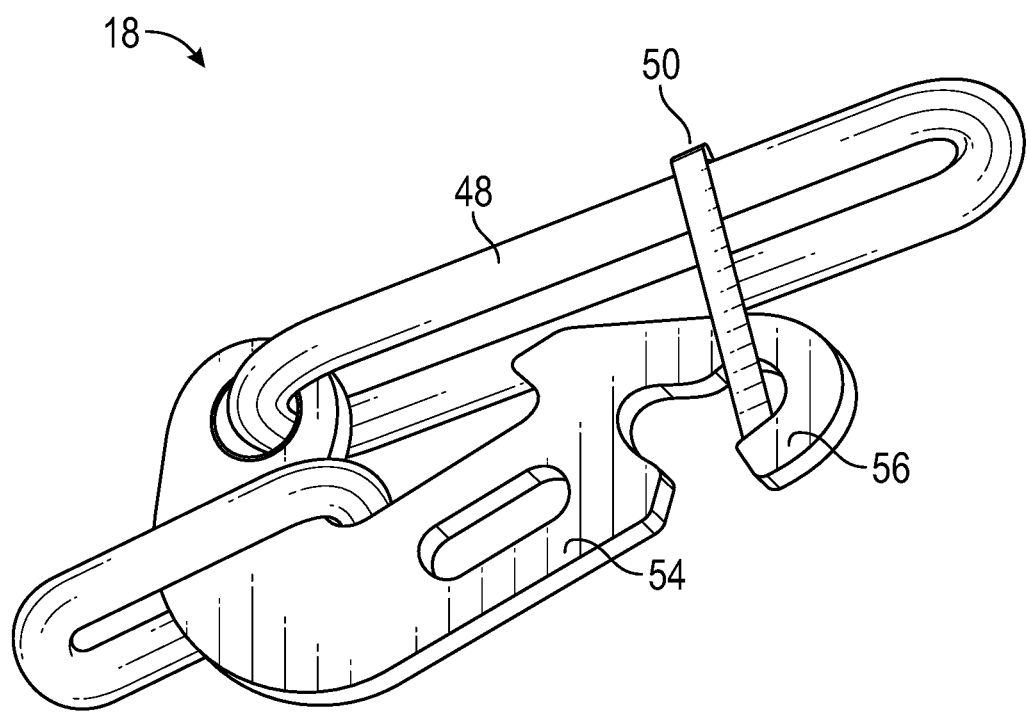
FIG. 4B is a perspective view of the chain system and the fastener in FIG. 4A in a locked state in accordance with one embodiment.

Now referring to FIGS. 4A and 4B, perspective views of a fastener 18 in an unlocked position and a locked position, respectively, are provided. In this embodiment, the fastener 18 comprises a fastener link 48 which is a chain link connected to one end of the side chain, a retainer 50 that slides along the fastener link 48 and has an aperture 52, and a fastener plate 54 that is connected to an end of the fastener link 48 and has a hook 56. FIG. 4B shows the fastener 18 secured to an opposing end of the side chain. The fastener plate 54 extends through a link at the opposing end of the side chain. Then, the retainer 50 passes over part of the fastener plate 54 such that the hook 56 extends through the aperture 52 and holds on to the retainer 50. Thus, the ends of the side chain are secured together such that a perimeter formed by the side chain is smaller than a perimeter formed by the outer edge of a track. As a result, the chain system is secured to the track.

Figure 5A:
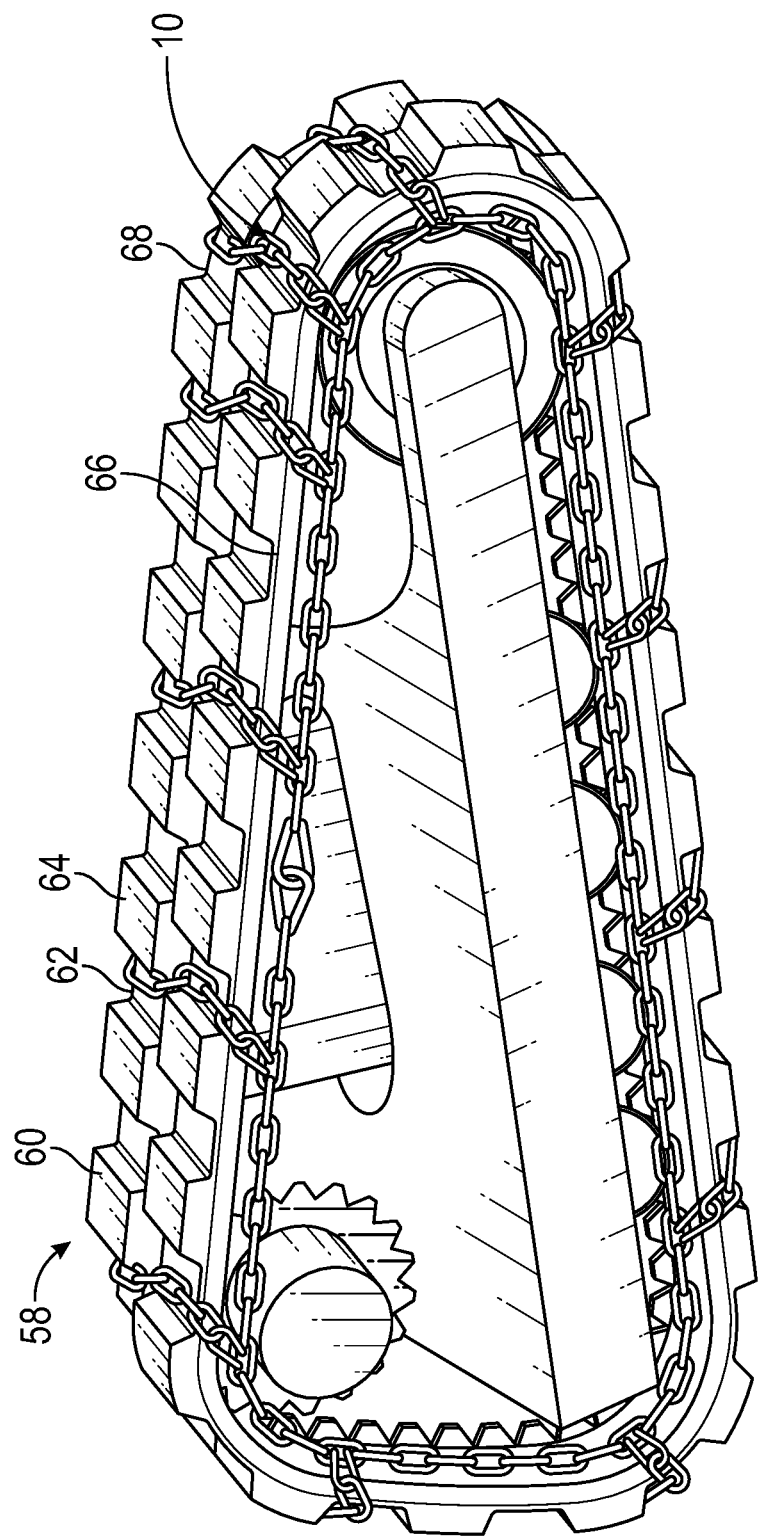
FIG. 5A is a perspective view of a chain system secured onto a track in accordance with one embodiment.

Now referring to FIG. 5A, a perspective view of a chain system 10 secured to a track 58 is provided. A tracked vehicle can have one or more tracks 58 but typically has two tracks 58. Each track 58 can have an outer surface with a tread 60 that is defined by a series of recesses 62 and protrusions 64. The track 58 also has an outer edge 66 and an inner edge 68. When putting the chain system 10 in place on the track 58, the hooks of the cross chains can be secured to the inner edge 68. It can be advantageous to position the hooks in the recesses 62 of the tread 60 to prevent bunching of the chain system when the chain system is being secured to the track. Then, the ends of the side chain are secured together such that the side chain is generally proximate to the outer edge 66 of the track. With the chain in place, the tracked vehicle has improved traction. An exemplary track size is 320×86×52, which represents a 320 mm or 12.6 inch wide track, an 86 mm pitch between links, and fifty two links. However, as described above, embodiments of the present disclosure encompass different sized chain systems and tracks.

Since recesses 62 and protrusions 64 alternate at the inner edge 68 of the track 58, there are twenty six recesses 62 at the inner edge 68 of the track 58 depicted in FIG. 5A. In some embodiments, the chain system 10 can have a number of cross chains that is equal to or less than the number of recesses 62 at the inner edge 68 of the track 58. In some embodiments, the chain system 10 has twenty two cross chains.

Figure 5B:
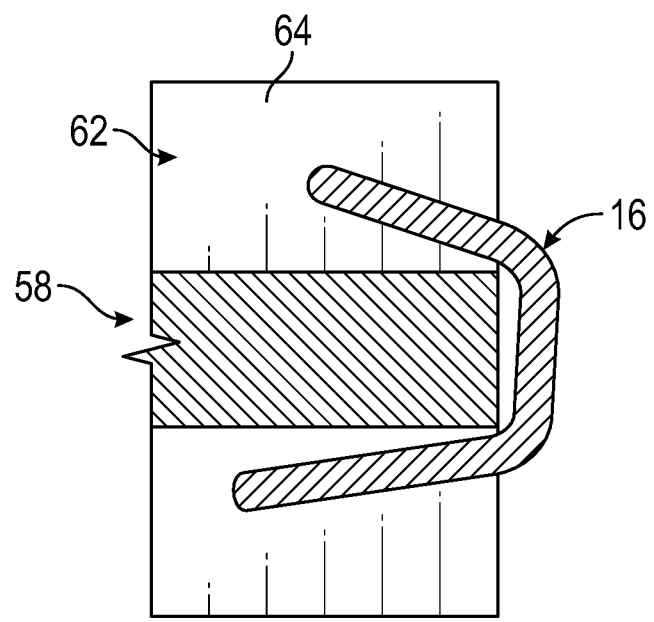
FIG. 5B is a cross-sectional view of a hook connected to a track in accordance with one embodiment.

Now referring to FIG. 5B, a cross-sectional view of a hook 16 connected to a track 58 is provided. The hook 16 connects to an inner edge of the track 58, and in the depicted embodiment, the hook 16 is positioned in a recess 62 between protrusions 64 of the track 58.

Figure 5C:
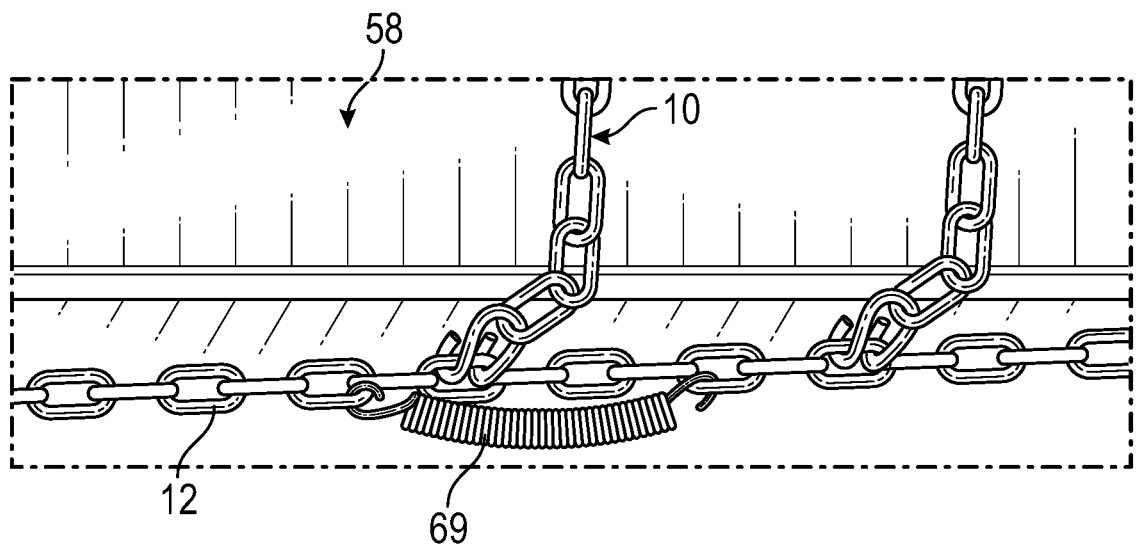
FIG. 5C is a perspective view of a chain system with a tension member secured onto a track in accordance with one embodiment.

Now referring to FIG. 5C, a perspective view of a chain system 10 with a tension member 69 is provided. The chain system 10 is positioned on a track 58, and the tension member 69 is connected to a side chain 12. Specifically, the tension member 69 in this embodiment is a spring with one end connected to one link in the side chain 12 and another end connected to another link in the side chain 12. The tension member 69 biases these two links toward each other. With at least one tension member 69, the chain system 10 can better absorb various forces on the chain system 10. As a result, the chain system 10 can be secured to the track 58 less tightly and with less force, and the chain system 10 is then less likely to unintentionally disconnect from the track 58. It will be appreciated that the spring of the tension member 69 can be between 2 and 6 inches in some embodiments, and the spring of the tension member 69 can be 4 inches in various embodiments. It will be further appreciated between four and eight tension members 69 can be connected to the side chain 12 of the chain system 10 in some embodiments, and six tension members 69 can be connected to the side chain 12 of the chain system 10 in various embodiments.

Figure 6A:
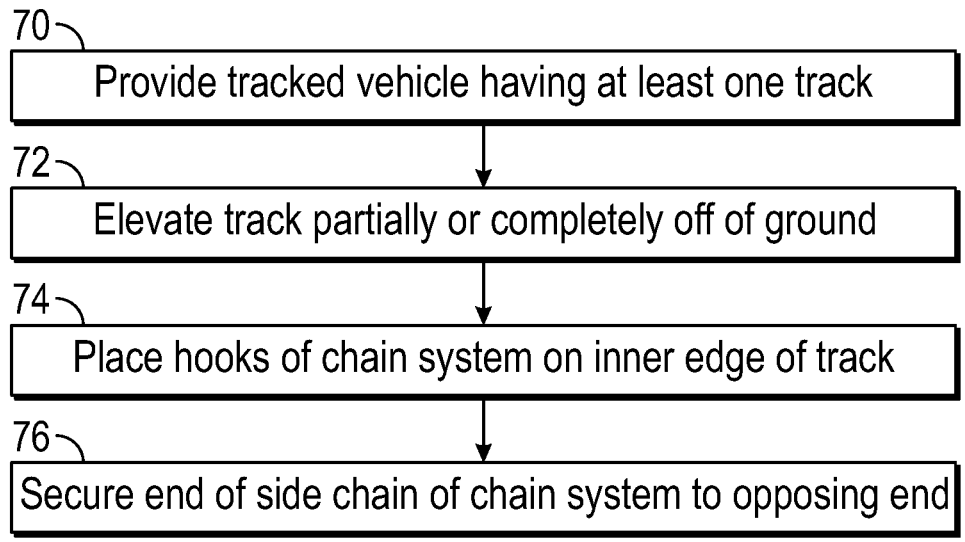
FIG. 6A is a process for attaching a chain system to a track in accordance with one embodiment.
Figure 6B:
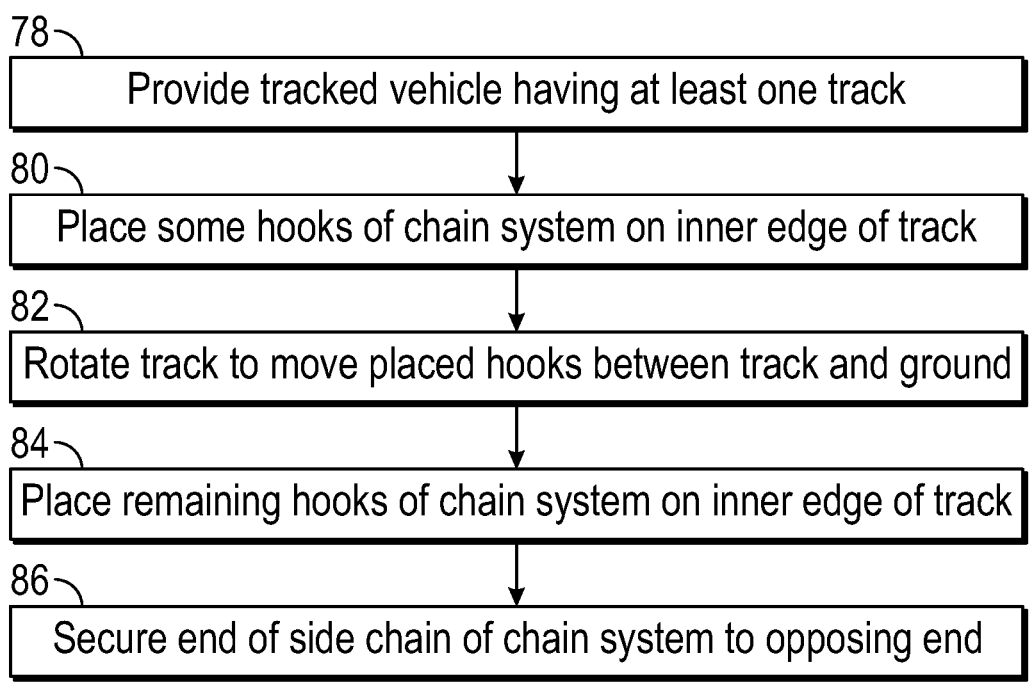
FIG. 6B is another process for attaching a chain system to a track in accordance with one embodiment.

Now referring to FIGS. 6A and 6B, two exemplary methods of securing a chain system to a track are provided. In FIG. 6A, a tracked vehicle is provided 70 that can have hydraulically powered buckets and/or arms, or the tracked vehicle can be located near a lift system. With one or more of these systems, a track of the vehicle can be partially or completely elevated 72 off of the ground to provide access to most or all areas of the track to place the chain system of the track. Then, hooks are placed 72 on the inner edge of the track, and the ends of the side chain are secured 76 together proximate to the outer edge of the track.

In FIG. 6B, when the tracked vehicle is provided 78 on the ground without any means of lifting the track off of the ground, the hooks are first placed 80 on the top surface of the track. Then, the vehicle is moved such that the track rotates 82 and the already-attached hooks and cross chains are now between the track and the ground. The remaining hooks are placed 84 on the track, and the ends of the side chain are secured 86 together proximate to the outer edge of the track.

The description of the chain system has been presented for purposes of illustration and description, but is not intended to be exhaustive or limiting of the chain system to the form disclosed. Many modifications and variations will be apparent to those of ordinary skill in the art. The embodiments described and shown in the figures were chosen and described in order to best explain the principles of the chain system, the practical application, and to enable those of ordinary skill in the art to understand the chain system.

While various embodiments have been described in detail, it is apparent that modifications and alterations of those embodiments will occur to those skilled in the art. Moreover, references made herein to "the chain system" or aspects thereof should be understood to mean certain embodiments of the chain system and should not necessarily be construed as limiting all embodiments to a particular description. It is to be expressly understood that such modifications and alterations are within the scope and spirit of the present disclosure, as set forth in the following claims.

What is claimed is:

1. A chain system for a track, comprising:
    a side chain extending along a longitudinal direction from a first end to a second end;
    a plurality of cross chains extending from the side chain in a lateral direction, wherein each cross chain of the plurality of cross chains has a free end;
    a hook positioned at the free end of each cross chain in the plurality of cross chains, each hook having a first portion connected to the free end, a second portion connected to the first portion, and a third portion connected to the second portion, wherein the first and second portions form an angle greater than 90 degrees, the second and third portions form an angle greater than 90 degrees, and a length of the third portion is greater than a length of the first portion, and wherein the first, second, and third portion define a space configured to receive an inner edge of a track.

2. The chain system of claim 1, further comprising:
    a fastener that selectively connects the first end of the side chain to the second end of the side chain to secure the chain system to the track.

3. The chain system of claim 1, wherein cross chains of the plurality of cross chains extend from the side chain at points that are offset from each other by a predetermined distance.

4. The chain system of claim 1, wherein the plurality of cross chains comprises twenty two cross chains.

5. The chain system of claim 1, wherein the length of the third portion is between approximately 157% and 186% of a length of the second portion.

6. The chain system of claim 5, wherein an angle formed by an axis of the second portion and an axis of the third portion is between approximately 100 and 130 degrees.

7. The chain system of claim 1, wherein at least one link of each cross chain of the plurality of cross chains comprises at least a quarter twist along a length of the at least one link.

8. A chain system for a track, comprising:
    a side chain extending along a longitudinal direction from a first end to a second end;
    a plurality of cross chains extending from the side chain in a lateral direction, wherein each cross chain of the plurality of cross chains has a free end;
    a hook positioned at the free end of each cross chain in the plurality of cross chains, each hook having a distal portion and an end portion connected to the distal portion, wherein a length of the distal portion is between approximately 157% and 186% of a length of the end portion, and wherein the distal portion and the end portion define a space configured to receive an inner edge of a track.

9. The chain system of claim 8, wherein the length of the end portion is between approximately 70% to 85% of a length of a proximal portion connected to the additional portion, and wherein the length of the distal portion is between approximately 125% and 145% of the length of the proximal portion.

10. The chain system of claim 9, wherein an angle formed by an axis of the proximal portion and an axis of the end portion is between approximately 90 and 110 degrees.

11. The chain system of claim 8, wherein an angle formed by an axis of the end portion and an axis of the distal portion is between approximately 100 and 130 degrees.

12. The chain system of claim 8, further comprising:
    a fastener that selectively connects the first end of the side chain to the second end of the side chain to secure the chain system to the track.

13. The chain system of claim 8, further comprising:
    a tension member extending between two links of the side chain, wherein the tension member biases the two links toward each other.

14. The chain system of claim 13, wherein the tension member comprises a spring with a first end connected to a first link and a second end connected to a second link.

15. A chain system for a track, comprising:
    a track having an outer surface with a tread, an inner edge, and an outer edge;
    a side chain extending along a longitudinal direction from a first end to a second end;
    a plurality of cross chains extending from the side chain in a lateral direction, wherein each cross chain of the plurality of cross chains has a free end;
    a hook positioned at the free end of each cross chain in the plurality of cross chains, each hook is secured to the inner edge; and
    a fastener that selectively connected the first end of the side chain to the second end of the side chain proximate to the outer edge such that cross chains of the plurality of cross chains extend laterally across the tread of the track.

16. The chain system of claim 15, wherein the tread comprises a plurality of recesses, and wherein the hook is secured in a recess of the plurality of recesses.

17. The chain system of claim 15, wherein cross chains of the plurality of cross chains extend from the side chain at points that are offset from each other by a predetermined distance.

18. The chain system of claim 15, wherein the hook comprises a distal portion and an end portion connected to the distal portion, and wherein a length of the distal portion is between approximately 157% and 186% of a length of the end portion.

19. The chain system of claim 18, wherein an angle formed by an axis of the end portion and an axis of the distal portion is between approximately 100 and 130 degrees.

20. The chain system of claim 15, wherein a size of the track is 320×86×52.

* * * * *